United States Patent
Florins et al.

(10) Patent No.: US 9,445,231 B2
(45) Date of Patent: Sep. 13, 2016

(54) GEO-FENCED PREMIUM CONTENT

(71) Applicant: Verizon Patent and Licensing Inc., Arlington, VA (US)

(72) Inventors: Evgenia Jane Florins, Arlington, MA (US); Kerry E. Brackett, Andover, MA (US); Allison M. Forgues, Medford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 97 days.

(21) Appl. No.: 14/462,829

(22) Filed: Aug. 19, 2014

(65) Prior Publication Data
US 2016/0057571 A1     Feb. 25, 2016

(51) Int. Cl.
*H04W 24/00*     (2009.01)
*H04W 4/02*      (2009.01)

(52) U.S. Cl.
CPC .................... *H04W 4/021* (2013.01)

(58) Field of Classification Search
CPC .................................................... H04W 4/021
USPC ......... 455/456.1, 456.2, 456.3, 456.4, 456.5, 455/456.6, 457
See application file for complete search history.

(56) References Cited

U.S. PATENT DOCUMENTS

| | | | |
|---|---|---|---|
| 7,359,496 B2* | 4/2008 | Qian .................... | H04M 3/533 379/201.07 |
| 2004/0117828 A1* | 6/2004 | Parker ................ | H04N 7/17318 725/46 |
| 2004/0143843 A1* | 7/2004 | Khoo .................... | G06Q 30/02 725/34 |
| 2009/0006336 A1* | 1/2009 | Forstall .................. | G06Q 30/00 |

* cited by examiner

*Primary Examiner* — Shahriar Behnamian

(57) ABSTRACT

A method includes receiving, via a network, first location information associated with a location of a mobile user device; determining that the first location information corresponds to a first area that is within a perimeter of one or more geo-fenced locations associated with a service provider; identifying media content associated with the one or more geo-fenced locations; obtaining an identifier associated with the mobile user device; determining whether user-specific criteria is associated with the identifier; providing, by the service provider and while the mobile user device is located within the perimeter, access to the identified media content responsive to determining that no user-specific criteria is associated with the identifier; applying, responsive to determining that user-specific criteria is associated with the identifier, the user-specific criteria to the identified media content to generate personalized media content; and providing, by the service provider, access to the personalized media content while the mobile user device is present within the perimeter.

20 Claims, 9 Drawing Sheets

GEO-FENCED PREMIUM CONTENT

BACKGROUND INFORMATION

Brick and mortar establishments commonly make media such as television, music, and/or various print media available to patrons in their lobbies and waiting rooms, the content of which is often informational, entertainment, or marketing-related media pertaining to the products and/or services offered by the establishments. In addition, patrons of such locations increasingly occupy their waiting time by using mobile devices to access the Internet under their individual data usage plans. Network connectivity, via wireless access points (e.g., a WiFi hotspot, a wireless router, etc.), for example, is often made available to patrons for use via their smart phones, notepads, laptops, etc., as prescribed by the applicable data usage plan.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to enabling user access to media content determined to be of potential interest to users to enhance user experience while within a virtual perimeter of a particular geo-fenced location (referred to herein as "geo-location" or "location"). Consistent with embodiments described herein, location-specific media content (referred to herein as "customized media content" or "premium media content") may be selectively provided (i.e., "personalized") to a user device based on the user's observed habits with respect to requesting, accessing, and/or consuming media content, the user's purchasing/ordering history with respect to particular products and/or services associated with the geo-location, the user's Internet browsing history, and/or other user-defined criteria. A service provider associated with identifying premium media content and presenting the identified premium media content via a user interface, such as an interactive user interface, may continuously and/or periodically update information regarding the user and/or the geo-location to further tailor the premium media content offered to the user based on geo-location and/or the user's habits, profile, and/or preferences. In addition, the service provider may collect data from an entity associated with the geo-location regarding the consumption of informational or entertainment content and/or the effectiveness of promotional material and provide the collected data to media content providers. The collected data provided may allow media content providers to further tailor the premium media content to present particular location-based information.

Figure 1:
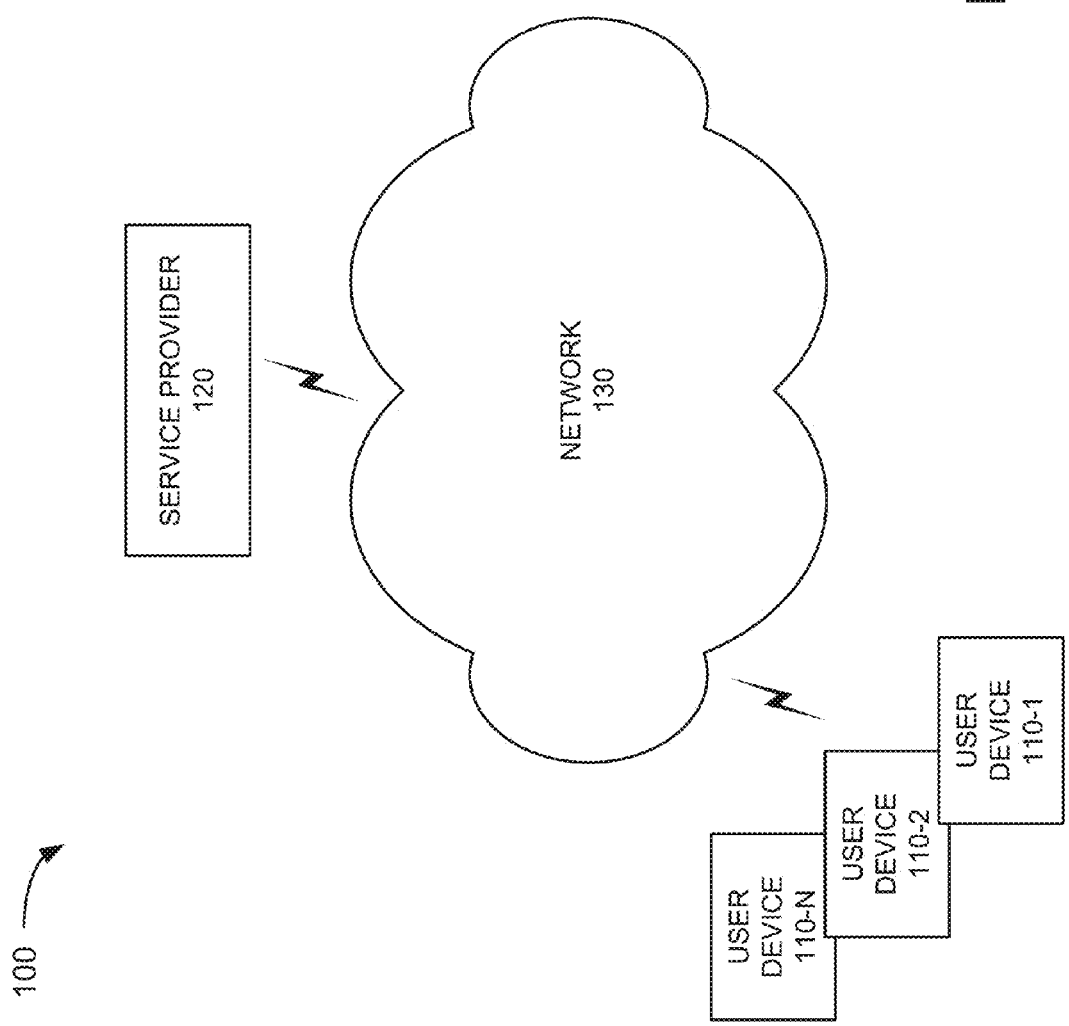
FIG. 1 illustrates an exemplary network in which systems and methods described herein may be implemented.

FIG. 1 is a block diagram of an exemplary network 100 in which systems and methods described herein may be implemented. Network 100 may include user device 110, service provider 120 and network 130.

User device 110 may include a personal computer (PC), a laptop or notebook computer, an ultra mobile personal computer (UMPC), a tablet computer, a netbook, or other types of computation or communication devices. User device 110 may also include any type of communication device, such as a voice over Internet protocol (VoIP) telephone (e.g., a session initiation protocol (SIP) telephone), a wireless or cellular telephone device, such as a smart phone (e.g., a personal communications system (PCS) terminal that may combine a cellular radiotelephone with data processing and data communications capabilities, a personal digital assistant (PDA) that can include a radio, or the like), a wearable computer device, such as glasses or a wrist watch, etc. In one implementation, user device 110 may include any device (e.g., an Internet Protocol (IP)-based device) that is capable of accessing services (e.g., Internet services) provided by service provider 120 via network 130. In some implementations, user device 110 may be configured to interact with customer premises equipment (CPE), such as a networking router (not shown) and/or connect to network 130 via wired, wireless, or optical connections.

Service provider 120 may include one or more computing devices, servers and/or backend systems that are able to connect to network 130 and transmit and/or receive information via network 130. In an exemplary implementation, service provider 120 may provide multimedia information, such as videos, advertisements, monitored (e.g., live) events, podcasts, and/or other media presentations to user device 110 for output to a user/viewer. Service provider 120 may also provide Internet access to users, such as a user associated with user device 110.

Service provider 120 may also provide a customized premium media content experience to a user associated with user device 110, as described in detail below. The term "premium media content" as used herein, should be construed to include multimedia content, such as multimedia informational, entertainment, and/or promotional content provided by service providers with respect to geo-locations, via a media stream received at a mobile device, via text-based media content provided as email, texts, and/or instant messages, audio-based premium media content provided to audio devices and/or mobile devices, or any other type of media content, such as social media.

Network 130 may include one or more wired, wireless and/or optical networks that are capable of receiving and transmitting data, voice and/or video signals, including multimedia signals that include voice, data, and/or video information. For example, network 130 may include one or more public switched telephone networks (PSTNs) or other type of switched network. Network 130 may also include one or more wireless networks and may include a number of transmission towers for receiving wireless signals and forwarding the wireless signals toward the intended destinations. Network 130 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, an optical network or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, backend systems, etc., that aid in routing information, such as media streams from service provider 120 to user device 110. In addition, user device 110 is shown as a single device in FIG. 1, in other implementations, the functions performed by a single device may be performed by two or more of devices or platforms operating in network 100.

As described briefly above, service provider 120 may provide premium media content access to users. In an exemplary implementation, service provider 120 may provide and/or identify premium media content to be provided to users (also referred to herein as "customers") based on a number of location-based and/or user-based factors, such as products and/or services associated with a geo-location, a user's habits with respect to requesting, accessing, and/or consuming media content, a user's habits with respect to searching the Internet, user-defined criteria, etc. In each case, service provider 120 may identify premium media content that is potentially of interest to the user with respect to the user's experience while present at a geo-location.

Figure 2:
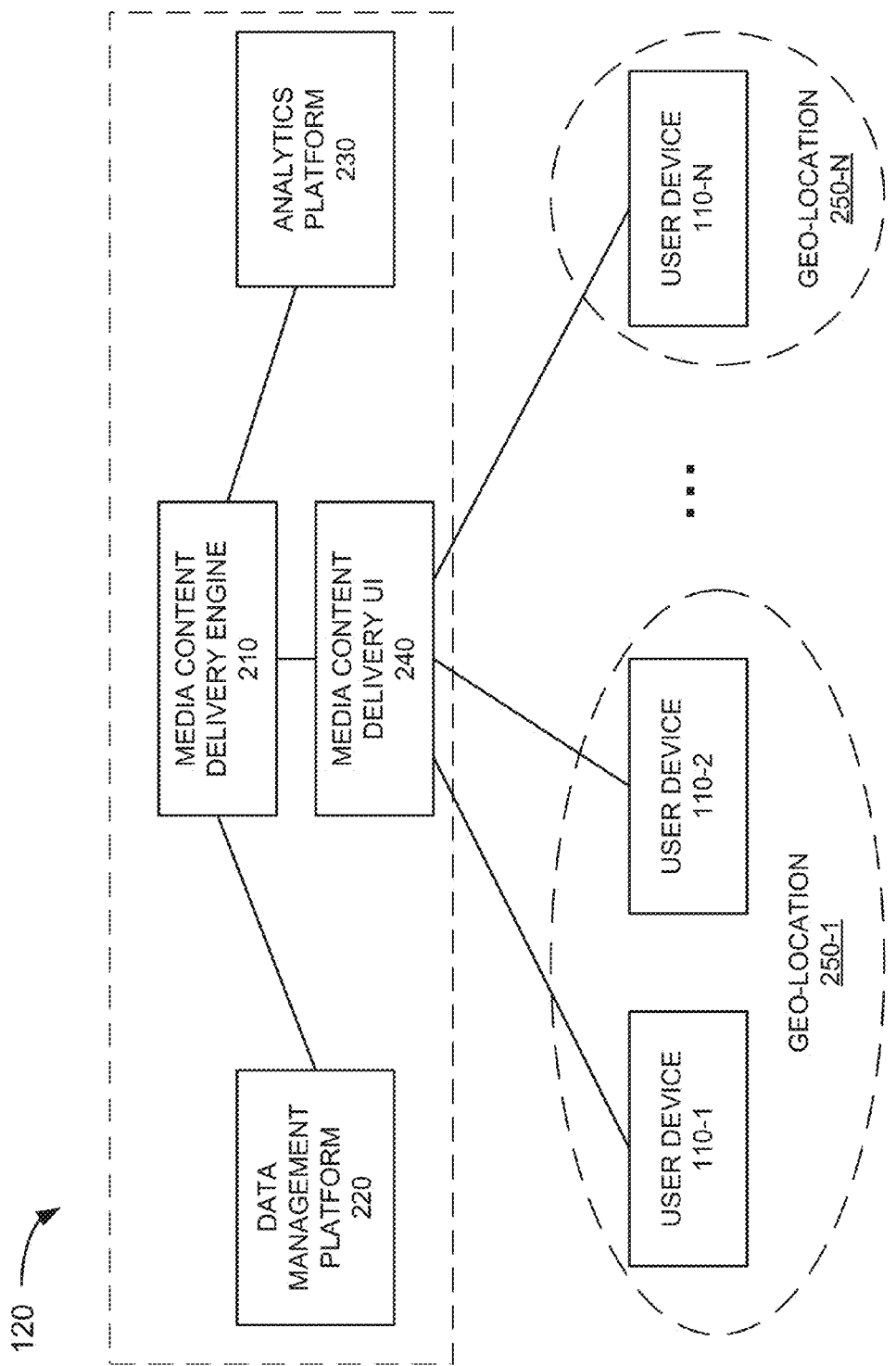
FIG. 2 illustrates an exemplary configuration of a portion of the network of FIG. 1.

FIG. 2 illustrates exemplary components associated with providing a customized and/or personalized geo-fenced location experience. Referring to FIG. 2, service provider 120 may include a media content delivery engine 210, a data management platform 220, an analytics platform 230, and a media content delivery user interface 240. The components illustrated within the dotted box may be implemented by service provider 120. In other implementations, one or more of these components may be implemented by another entity, e.g., user device 110, or a third party.

In each case, service provider 120 may provide a customized and/or personalized premium media content experience at geo-locations 250-1 through 250-N (referred to collectively as geo-locations 250) to customers associated with user devices 110-1 through 110-N (referred to collectively as user devices 110), such that a customer at user device 110-1 may be provided access to the same or different premium media content than a customer at user device 110-2 when both customers are at the same geo-location 250-1; and a customer at user device 110-1 may be provided access to different premium media content at a first geo-location (e.g., 250-1) than a second geo-location (e.g., 250-2); and also not shown, a customer at user device 110-1 may be provided access to different premium media content at a geo-location (e.g., 250-1) at a first time than at another time at the same geo-location (e.g., 250-1).

Media content delivery engine 210 may include one or more computing devices that identify particular premium media content determined to be of potential interest at a particular geo-location and/or to a particular customer. For example, media content delivery engine 210 may identify and/or serve premium media content to include in a media stream delivered to geo-locations 250-1 through 250-N to user devices 110-1 through 110-N. In an exemplary implementation, media content delivery engine 210 may serve premium media content at a particular geo-location 250 tailored or customized to particular individual customers, as described in detail below.

Data management platform 220 may include one or more computing devices that collect and store information associated with first party data obtained from a user's interaction with service provider 120. For example, data management platform 220 may obtain data collected by service provider 120 based on a user's profile, such as products and/or services that the user accesses and/or consumes from service provider 120. Data management platform 220 may also obtain data based on a user's requesting, accessing, and/or consuming media content habits, a user's Internet browsing history, a user's online ordering/purchasing history, etc. Data management platform 220 may also obtain data from third parties, such as retailers, social media sites, etc., that may be used to aid in identifying premium media content determined to be of potential interest to a particular customer. In some implementations, data management platform 220 may obtain an Internet protocol (IP) address associated with the customer based on the customer contacting a service/help website associated with service provider 120. The IP address may then be used to obtain additional information regarding the customer, such as the customer's likely age and/or gender.

Additionally or alternatively, data management platform 220 may include one or more computing devices that collect and store information associated with geo-location operator data obtained from a geo-location operator's interaction with service provider 120. For example, data management platform 220 may obtain data collected by service provider 120 based on a geo-location operation profile, such as products and/or services provided at geo-location 250, an identified perimeter defining geo-location 250, location information associated with geo-location 250, etc. Data management platform 220 may also obtain data based on print, audio, and/or video media available at the geo-location facility to patrons. Data management platform 220 may also obtain data from third parties, such as corporate headquarters, regional headquarters, franchisor headquarters, etc., that may be used to aid in identifying premium media content determined to be of potential interest at geo-locations 250. In some implementations, data management platform 220 may obtain terms of the geo-location operator's and/or other sponsorship of data usage for providing access to premium media content. The sponsorship terms may then be used to aid customer's in gaining access to the premium media content.

Analytics platform 230 may include one or more computing devices that analyze data associated with location-based premium media content and/or user-specific premium media content. For example, analytics platform 230 may analyze the consumption of premium media content based on whether users (or a particular user) accessed the premium media content and an aggregated amount of time accessing, consuming, and/or interacting with premium media content, e.g., downloading information associated with premium media content, conducting a transaction associated with the premium media content, etc.

Media content delivery user interface 240 may include one or more computing devices that provide a user interface, such as a graphical user interface (GUI), which allows a geo-location operator and/or a user to define criteria with respect to premium media content. For example, a geo-location operator and/or a user may define types or categories of premium media content not to be accessed (e.g., set user or parental controls), such as premium media content associated with adult-related content, premium media content associated with certain types of food, beverages, and/or consumer products (e.g., sugar-laden or high fat content snack food, alcohol, tobacco), premium media content with violent themes, competitors' advertisements, unfavorable reviews, etc. Media content delivery user interface 240 may also allow a user to define premium media content for certain products and/or services or types of products and/or services (e.g., consumer electronics, automobiles, etc.) permitted for access. In some implementations, media content delivery user interface 240 may allow a geo-location operator and/or user to enter subjective criteria associated with delivering premium media content, such as request that service provider 120 prioritize premium media content deemed family-friendly, humorous, religious, political, professional, etc.

Media content delivery engine 210 may receive inputs from data management platform 220, analytics platform 230, and media content delivery user interface 240 and identify premium media content or premium media content categories determined to be of potential interest at each geo-location 250 and/or to each customer. In this manner, media content delivery engine 210 provides an enhanced premium media content experience for geo-location 250 customers, as described in detail below.

Figure 3:
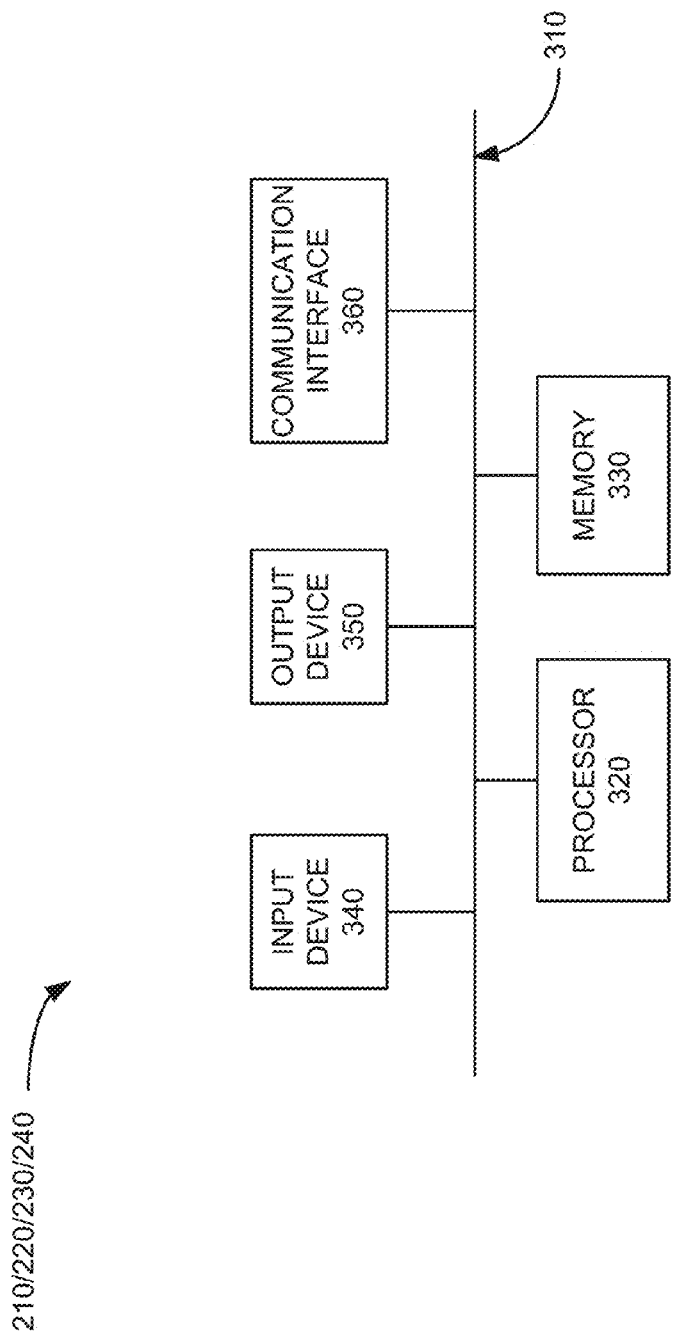
FIG. 3 illustrates an exemplary configuration of logic components implemented in one or more of the components of FIG. 2.

FIG. 3 illustrates an exemplary configuration of media content delivery engine 210. Data management platform 220, analytics platform 230, and/or media content delivery user interface 240 may be configured in a similar manner. In addition, other devices in network 100, such as user device 110, may be configured in a similar manner. Referring to FIG. 3, media content delivery engine 210 may include a bus 310, a processor 320, a memory 330, an input device 340, an output device 350, and a communication interface 360. Bus 310 may include a path that permits communication among the various elements of media content delivery engine 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to media content delivery engine 210, such as a keyboard, a keypad, a mouse, a pen, a microphone, a touch screen, voice recognition and/or biometric mechanisms, etc. Output device 350 may include a mechanism that outputs information to the user, including a display, a printer, a speaker, etc.

Communication interface 360 may include a transceiver that media content delivery engine 210 may use to communicate with other devices (e.g., user devices 110, data management platform 220, analytics platform 230, media content delivery user interface 240, etc. For example, communication interface 360 may include mechanisms for communicating with user device 110 via wired, wireless or optical mechanisms. Communication interface 360 may also output premium media content into a media stream to be output to user device 110 or signal a premium media content inserter (not shown) associated with service provider 120 to insert premium media content into the media stream to be output to user device 110. Communication interface 360 may also include one or more radio frequency (RF) transmitters, receivers and/or transceivers and one or more antennas for transmitting and receiving RF data via network 130. Communication interface 360 may also include a modem or an Ethernet interface to a LAN or other mechanisms for communicating via a network, such as network 130 or another network.

The exemplary configuration illustrated in FIG. 3 is provided for simplicity. It should be understood that media content delivery engine 210 may include more or fewer devices than illustrated in FIG. 3. For example, various modulating, demodulating, coding and/or decoding components or other components may be included in media content delivery engine 210.

Media content delivery engine 210 may perform processing associated with identifying and/or providing premium media content at geo-locations 250 to customers, such as customers associated with communication devices 110 at geo-locations 250. Media content delivery engine 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
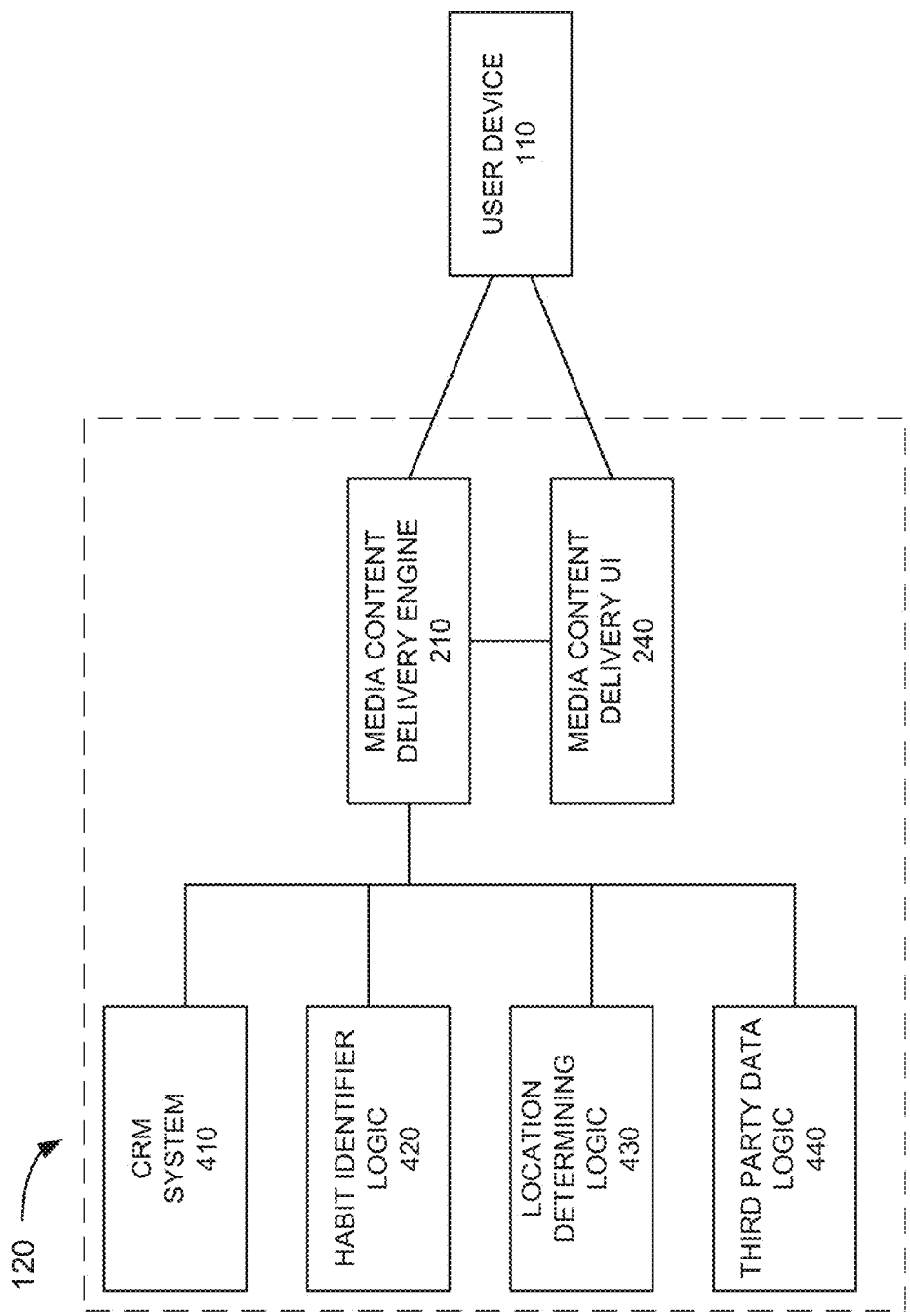
FIG. 4 illustrates exemplary components implemented by the service provider of FIG. 1.

FIG. 4 is an exemplary functional block diagram of components implemented in service provider 120 to aid in providing identified premium media content at geo-locations 250 to customers. Referring to FIG. 4, service provider 120 includes customer relationship management (CRM) system 410, habit identifier logic 420, location determining logic 430, and third party data logic 440. The components illustrated within the dotted box may be implemented by service provider 120. In other implementations, one or more of these components may be implemented by another entity, e.g., user device 110. Media content delivery engine 210 may receive inputs from components 410-440 and identify premium media content that would be expected to be of potential interest at geo-location 250 to the customer based on one or more of the inputs.

For example, CRM system 410 may include one or more computing devices that store information regarding geo-location 250's and/or a customer's profile, such as products and/or services provided to and/or consumed by each customer. As an example, assume that a geo-location operator associated with geo-location 250 in FIG. 2 is a provider of healthcare services in a multi-story building in an office suite located at a particular physical address. In this case, CRM system 410 may store information regarding a type of healthcare service (e.g., general or specialized practice areas, etc.) provided at the geo-location facility. CRM system 410 may also store information regarding the print (magazines and/or other periodicals), audio, and/or video media available at geo-location 250. CRM system 410 may also store information regarding locations of each waiting room with respect to the office layout, as well as store other information associated with geo-location 250, such as information identifying the types of insurance accepted at geo-location 250, average wait times, etc. CRM system 410 may also store demographic data associated with the patients, such as the age of the patients, gender of the patients, number, age and relationship of people accompanying the patients, salary information associated with the patients, etc. Media content delivery engine 210 may selectively use all or any portion of this information to customize a premium media content experience for each particular geo-location 250.

As another example, assume that a user associated with user device 110-1 in FIG. 2 is a subscriber to cable television services, Internet services, and telephone services from service provider 120. In this case, CRM system 410 may store information regarding a level of cable TV service (e.g., level of service/channels subscribed to, premium channels subscribed to, pay per view movies or programs downloaded or purchased, etc.) to which the customer subscribes. CRM system 410 may also store information regarding the level of Internet service to which the customer subscribes (e.g., data usage plan). CRM system 410 may also store information regarding customer purchases during particular time frames, as well as store other interactions with service provider 120, such as information requesting information via one or more widgets accessed by user device 110 via output device 340 while watching television. CRM system 410 may also store demographic data associated with the customer, such as the age of the customer, gender of the customer, number, age and relationship of household members, salary information, etc. Media content delivery engine 210 may selectively use all or any portion of this information to personalize a premium media content experience for each particular customer.

Habit identifier logic 420 may include logic that identifies and stores habit information for each geo-location customer. For example, habit identifier logic 420 may identify habits associated with the geo-locations customers' requesting, accessing, and/or consuming of media content. In particular, habit identifier logic 420 may identify a customer's behavior with respect to requesting, accessing, and/or consuming media content, such as whether the customer prefers one type of media content over other types of media content, including saving links to the media content, making recommendations of the media content to others, interacting with interactive media content provided via user device 110, etc.

In instances where service provider 120 also provides Internet service to the customer associated with user device 110, habit identifier logic 420 may access Internet access history associated with user device 110, identify websites visited and time spent on particular websites, identify types of websites frequently visited (e.g., sports related websites, shopping websites, particular retailer websites, etc.), identify search queries (e.g., searches made for a particular product) and/or browsing history, etc. Habit identifier logic 420 may selectively use all or any portion of this data to identify habits and interests of a customer and/or trend habits and interests as a function of time.

Location determining logic 430 may be configured to calculate or determine a geographic location of user device 110. For example, location determining logic 430 may include global positioning system (GPS) logic for receiving GPS signals from a number of orbiting satellites and determining a geographic position (e.g., longitude and latitude, street address, floor number, suite number, room number, etc.) based on the received GPS signals. Additionally and/or alternatively, location determining logic 430 may optionally include geospatial location determination logic configured to enable the application to dynamically determine a geospatial location of user device 110, for example, relative to particular street address. By incorporating geospatial location technology, the service provider is not limited in its ability to effectively ascertain the user device's location indoors and/or its ability to provide location information relative to a specific environment. For example, geospatial location technology allows location determining logic 430 to determine not only that the user device is located at a particular longitude, latitude, and elevation, but more specifically that the user device is located in a particular suite of a multi-suite facility, a particular department of a department store, etc.

Consistent with embodiments described herein, location determining logic 430 may be configured to store, in a database, location information associated with geo-location 250 perimeters and corresponding physical addresses (e.g., street address, geo-coordinates, etc.) for geo-locations 250. Location determining logic 430 may determine whether the location information corresponds to one or more geo-locations 250 stored in the database. In cases where the location information is non-specific and/or matches multiple stored geo-locations 250-1 to 250-N, location determining logic 430 may generate a request to another device, e.g., user device 110, for additional location information related to the location of user device 110. For example, service provider 120 may present a request to a user of user device 110 via a GUI, requesting that the user provide information specifying the location of user device. In one implementation, the request may identify each of the possible geo-locations 250-1 to 250-N (e.g., by suite number, name of the establishment, floor number, room name/number, etc.), and prompt the user to select the correct one. Based on the additional location information that is obtained from the user responsive to the request, location determining logic 430 may determine which of the stored geo-locations 250-1 to 250-N corresponds to the current location of user device 110.

Third party data logic 440 may include logic and/or one or more memories that obtain and store data gathered from entities external to service provider 120. For example, third party data logic 440 may obtain data from marketing entities that gather data on viewers, such as demographic information including estimated income information, data regarding publications (e.g., magazines, newspapers) to which the customer subscribes, etc. Third party data logic 440 may also obtain information regarding customers that is gathered from social websites, professional network websites, etc.

CRM system 410, habit identifier logic 420, location determining logic 430, and/or third party data logic 440 may provide input to media content delivery engine 210. Media content delivery engine 210 may also receive input directly from the geo-location operator and/or customer via media content delivery user interface 240. As described above, media content delivery user interface 240 may provide a GUI that allows the geo-location operator and/or user to input information identifying particular premium media content or types of premium media content that is preferred, is not preferred, etc. Media content delivery engine 210 may receive all the inputs from these devices and identify premium media content determined to be potentially of more interest than other premium media content at a particular geo-location 250 to a particular customer, as described in more detail below.

Figure 5:
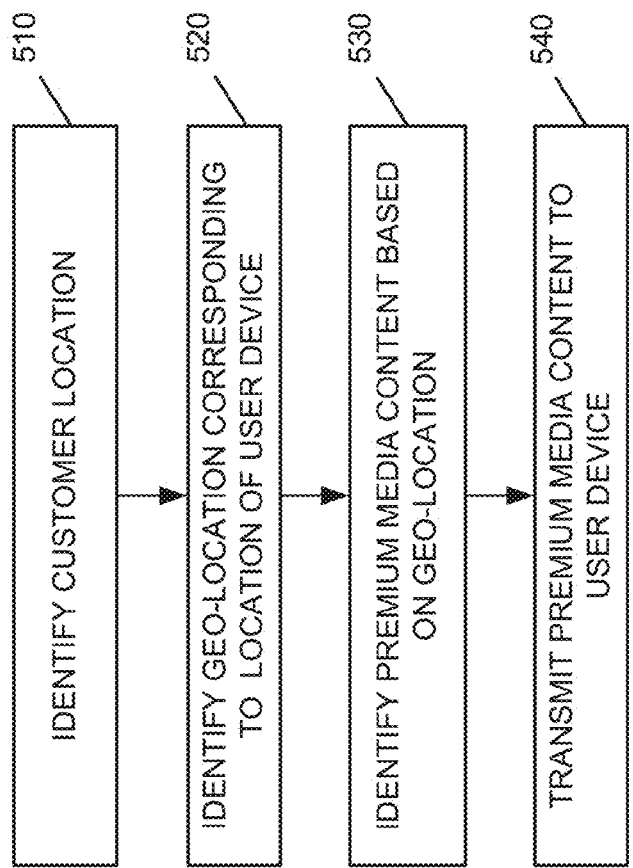
FIG. 5 is a flow diagram illustrating exemplary processing associated with identifying premium media content for a customer.

FIG. 5 illustrates exemplary processing associated with providing location-based premium media content. In this example, assume that user device 110 is a mobile device, such as a smart phone, that includes an application provided by service provider 120, for example, that allows user device 110 to access premium media content, such as text-based premium media content or multimedia-based premium media content. Alternatively, the geo-location application may have already been installed on user device 110 at purchase/set-up.

Referring to FIG. 5, processing may begin with media content delivery engine 210 identifying the customer's location (block 510). For example, the application on user device 110 may transmit its location (e.g., global positioning system (GPS) coordinates) to service provider 120. Media content delivery engine 210 may then identify the customer's location based on the location of user device 110. In other embodiments, media content delivery engine 210 of service provider 120 may monitor one or more geo-locations 250-1 to 250-N and detect the presence of user device 110 when user device 110 enters (and/or is approaching) a perimeter of the monitored geo-location 250.

Media content delivery engine 210 may identify one or more geo-locations 250 that correspond to user device 110's location (block 520). More than one geo-location 250-1 to 250-N may be identified, for example, when the obtained location for user device 110 is imprecise, the perimeters of the geo-locations 250-1 to 250-N overlap, etc. The perimeter of geo-location 250 may include a region within a certain radius (e.g., 100 feet, 100 yards, one-quarter mile, one miles, ten miles, etc.) of the user device's determined location.

In cases where multiple geo-locations 250-1 to 250-N are identified based on an initial determination of a location, media content delivery engine 210 may generate a request to user device 110 for additional location information. In one implementation, media content delivery engine 210 may request user device 110 to provide additional GPS and/or geospatial information. Based on the additional location information received, media content delivery engine 210 may determine which of the multiple geo-locations 250-1 to 250-N is a best match geo-location 250 for the current location of user device 110.

When the additional location information eliminates at least one of the geo-locations 250-1 to 250-N, but two or more geo-location 250-1 to 250-N remain as possibilities, media content delivery engine 210 may request a user of user device 110 to provide specific location information. For example, the user may be asked to provide a description of the location, such as a suite number, floor number, and/or a name or type of a business located at geo-location 250. Based on the specific location information received, media content delivery engine 210 may determine which of the multiple geo-locations 250-1 to 250-N is a best match for the current location of user device 110. When the specific location information eliminates at least one of geo-locations 250-1 to 250-N, but two or more geo-location 250-1 to 250-N remain as possibilities, media content delivery engine 210 may request a user of user device 110 to provide further specific location information until media content delivery engine 220 can accurately identify the correct geo-location 250. For example, media content delivery engine 210 may generate a GUI that includes a prompt that provides options to the user for selection (e.g., "Please select your location: A) "Family Medicine Practice," B) "Smile Orthodontics," "Red Rocks Day Spa," etc.). Based on the specific location information received, media content delivery engine 210 may determine which of the multiple geo-locations 250-1 to 250-N is a best match for the current location of user device 110. In some implementations, media content delivery engine 210 may request devices at the two or more possible geo-locations 250-1 to 250-N to confirm the presence of user device 110, for example, via communications to/from radio-frequency identification (RFID) devices and/or other presence-sensing devices located at two or more geo-locations 250-1 to 250-N.

Media content delivery engine 210 may then identify premium media content that may likely be of interest to customers at the determined geo-location 250 (block 530). For example, assume that a perimeter of geo-location 250 is set to correspond to an airport location. Further assume that the airport authority has contracted with service provider 120 to provide premium media content to user devices within airport property. In this case, media content delivery engine 210 may transmit the identified premium media content to user device 110 upon entering airport property (block 540). In some instances, media content delivery engine 210 may transmit information, such as passenger pick-up/drop-off locations, parking lot locations/pricing/availability, security screening procedures etc., that allows the customer to obtain information regarding the airport. In each case, media content delivery engine 210 may interact with an application provided on user device 110 to provide customized premium media content determined to be of potential interest to customers at geo-location 250. In one implementation, a user may interact with media content delivery engine 210 to receive personalized information, such as specific airline information (e.g., flight status updates, boarding times, seating availability, etc.). In some implementations, the premium media content may be provided to user device 100 in such a way so as to preempt and replace other media on user device 100, for example, to notify airport customers of security alerts, provide pre-flight airplane safety procedures information, etc. Similar processes may be used in schools and other institutions, stadiums, arenas, etc.

In some implementations, media content delivery engine 210 may also determine whether some of the premium media content is of particular of interest to the customers within geo-location 250 before transmitting the premium media content to particular customers. For example, the set of premium media content identified for a particular geo-location 250 may be further refined based on user-specific criteria associated with a particular user device, as described in more detail below.

Figure 6:
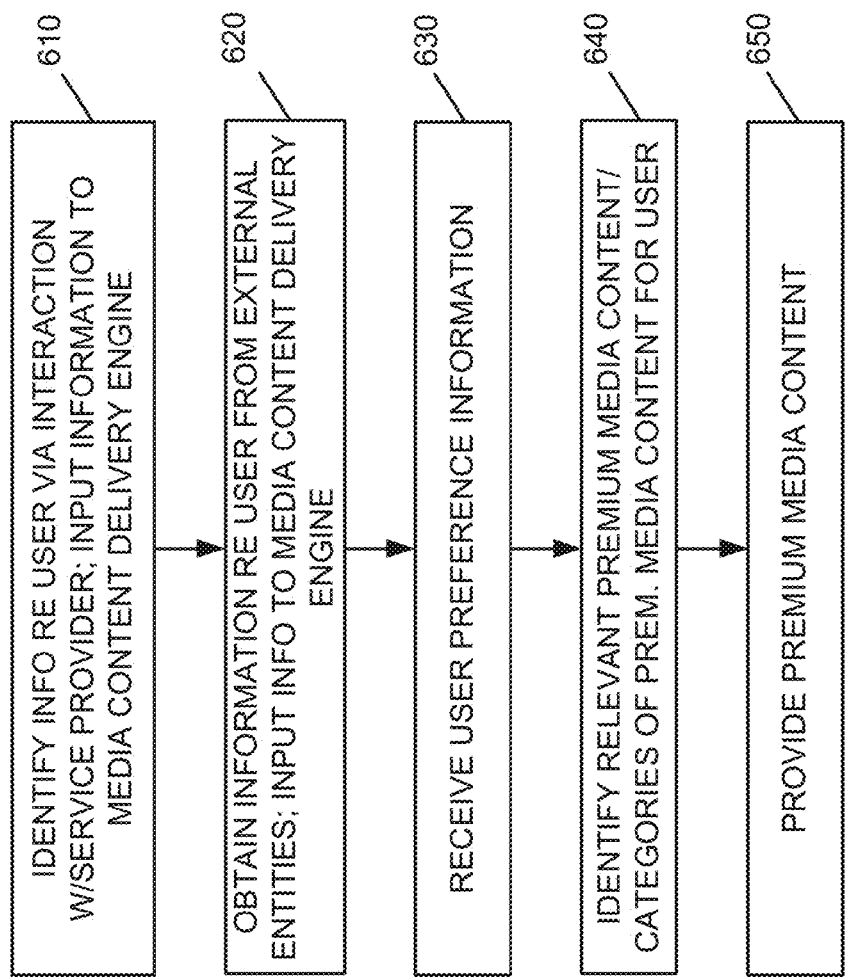
FIG. 6 is a flow diagram illustrating exemplary processing associated with providing personalized premium media content.

FIG. 6 is a flow diagram illustrating exemplary processing associated with identifying premium media content to be made accessible at one or more geo-locations 250 for one or more customers. In this example, assume that service provider 120 provides cable TV programming, Internet service, and/or telephone service (e.g., landline telephone service and/or wireless telephone service) to a customer associated with user device 110-1 shown in FIG. 2. Processing may begin with CRM system 410, habit identifier logic 420, location determining logic 430, and third party data logic 440 gathering user-specific criteria associated with the customer. For example, CRM system 410 may gather information associated with the customer's interaction with service provider 120 (block 610). As discussed above, CRM system 410 may gather and store information regarding a level of cable TV service (e.g., premium channels subscribed to, pay per view movies or programs downloaded or purchased, etc.) to which the customer subscribes. CRM system 410 may also store information regarding the level of Internet service to which the customer subscribes. CRM system 410 may further store information regarding customer purchases during particular time frames, customer interaction via one or more widgets associated with watching television provided via output device 350, etc. CRM system 410 may also store demographic data associated with the customer, such as the age of the customer, gender of the customer, number, age, and relationship of household members, salary information, etc.

Habit identifier logic 420 may identify habits associated with the customer's requesting, accessing, and/or consuming media content over a period of time (e.g., one day, one week, one month, etc). In particular, habit identifier logic 420 may identify a customer's behavior with respect to preferences of the media content relative to other types of media content demonstrated by saving links to the media content, making recommendations of the media content to others, interacting with interactive media content provided via user device 110, etc. In this case, habit identifier logic 420 may determine that the customer is not a car owner and that media content delivery engine 210 should not provide the customer with car-related premium media content. As another example, habit identifier logic 420 may determine that the user fast forwards through car-related premium media content for brand X, but watches car-related premium media content for brand Y. In this case, habit identifier 420 may determine that the customer is a car owner interested in brand Y.

Continuing with the exemplary scenario, assume that service provider 120 also provides Internet service to the customer. Habit identifier logic 420 may access Internet access history associated with user device 110, identify websites visited and time spent on particular websites, identify types of websites frequently visited (e.g., sports related websites, shopping websites, particular retailer websites, etc.), identify searches made and/or browsing history, etc. Habit identifier logic 420 may selectively use all or any portion of this data to identify habits and current interests of a customer.

For example, habit identifier logic 420 may determine that the customer, while consuming media content, entered a search query for exercise equipment in the browser of user device 110 and searched several fitness websites for exercise equipment. In this case, habit identifier logic 420 may determine that the customer is currently interested in fitness-related media content.

CRM system 410 and habit identifier logic 420 may input the obtained user-specific criteria to media content delivery engine 210 (block 610). Media content delivery engine 210 may use the user-specific criteria to identify premium media content that is likely to be of potential interest to the customer, as described in more detail below.

Media content delivery engine 210 may also obtain information regarding the customer from external entities (block 620). For example, third party data logic 440 may obtain data regarding the customer via marketing entities that gather data on viewers, such as demographic information including estimated income information, publications to which the customer subscribes, etc. Third party data logic 440 may also gather information regarding the customer from social websites (e.g., the customer's interests), professional network websites (e.g., the customer's profession), etc. Based on the demographic information, third party data logic 440 and/or media content delivery engine 210 may identify premium media content for products/services that would potentially be of some interest to the customer. As an example, based on demographic information, such as the customer's estimated salary information, number of members in the customer's household, age of household members, etc., third party data logic 440 and/or media content delivery engine 210 may determine that the customer would potentially be more interested in automobile premium media content for mid-level or luxury sedans than premium media content for small, economy cars. Third party data logic 440 may forward this information, as it becomes available, to media content delivery engine 210 (block 620).

Media content delivery engine 210 may also obtain user preference information via media content delivery user interface 240 (block 630). As described above, media content delivery user interface 240 may include a GUI that allows a user to define criteria with respect to premium media content. For example, a user may define types or categories of premium media content that the user does not prefer to access, such as premium media content associated with alcohol-related products, premium media content of a sexual nature, premium media content for certain types of food (e.g., sugary snacks), premium media content with customer reviews, premium media content with violent themes, etc. The user may also define premium media content/types of premium media content that the user prefers to access (e.g., premium media content related to new consumer electronics, premium media content related to home improvement products, premium media content for automobiles, etc.). As described above, in some implementations, media content delivery user interface 240 may allow the user to enter subjective criteria associated with delivering premium media content, such as request that service provider 120 provide only premium media content that are deemed family-friendly, provide premium media content that is not promotional in nature, provide premium media content that is humorous, etc. Media content delivery user interface 240 may forward the user-defined criteria to media content delivery engine 210.

Media content delivery engine 210 may selectively use all or any portion of the received information to identify premium media content or types of premium media content that are likely to be of some potential interest to the customer (block 640). For example, based on all the received information, media content delivery engine 210 may determine that the customer is likely to be in a demographic in which the user may want to access information related to car repair, but does not want to access promotional premium media content. In this case, media content delivery engine 210 may signal a premium media content provider (not shown) that is part of the headend system used by service provider 120 to provide premium media content related to car repair, excluding promotional content. In other implementations, service provider 120 may simply blank out certain premium media content (e.g., promotional premium media content) without providing any alternative premium media content.

In this example, assume that media content delivery engine 210 identifies premium media content each time user device enters a perimeter of geo-location 250, which is tailored to the user of communication device 110. Service provider 120 may then provide the identified types of premium media content based on the information received from media content delivery engine 210 and provide the premium media content to user device 110 (block 650). In this manner, service provider 120 may deliver premium media content that is likely to be of some potential interest to the particular customer rather than other premium media content that is provided to other customers at same the geo-location 250-1 to 250-N.

In some implementations, media content delivery user interface 240 may allow the user to input preference information regarding parameters for delivery of premium media content to the customer. In some implementations, media content delivery engine 210 may interface with a radio station to deliver premium media content. For example, when the customer associated with user device 110 is going shopping, the customer may tune to a designated premium media content station to receive audio-based premium media content.

As described above, media content delivery engine 210 may deliver premium media content from various providers and/or sponsors to particular customers. In some implementations, service provider 120 may track the consumption of premium media content related to particular providers and/or sponsors, as described in detail below.

Figure 7:
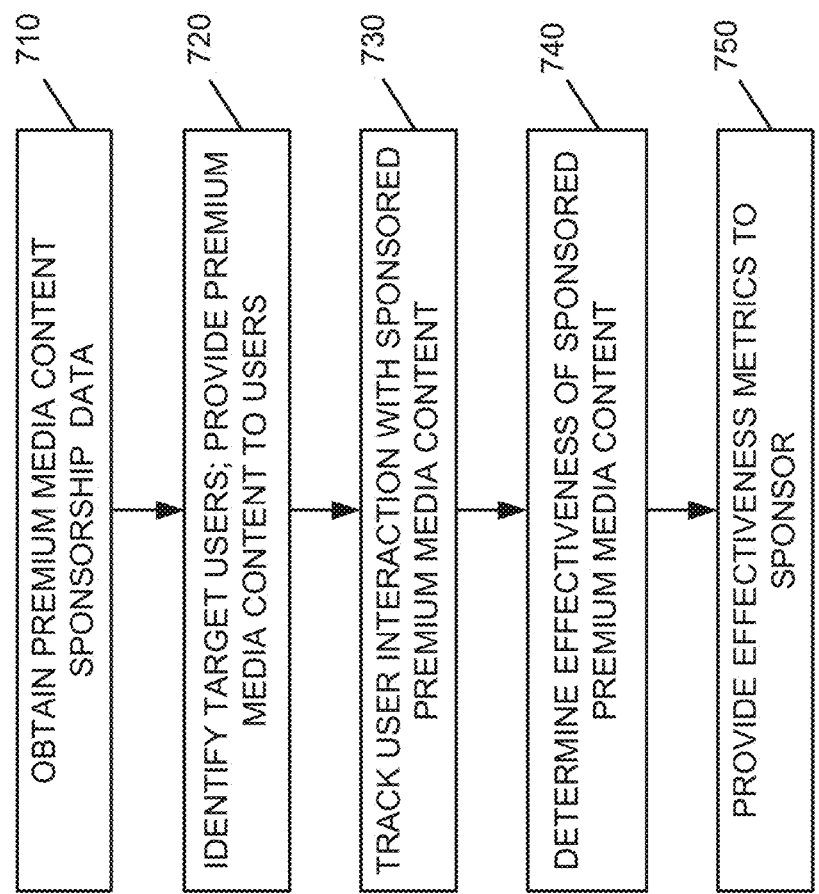
FIG. 7 is a flow diagram illustrating exemplary processing associated with tracking the effectiveness of sponsored premium media content.

FIG. 7 illustrates exemplary processing associated with tracking consumption of premium media content that may be sponsored premium media content. For example, assume that a particular restaurant has undertaken sponsorship of data usage for providing access to premium media content at particular geo-locations 250. In this implementation, service provider 120 may provide content streaming for particular sponsors for providing premium media content that is destined to a selected geo-location 250 and a target consumer for whom the premium media content is likely to be of potential interest, as compared to providing the premium media content to other customers at the selected geo-location 250. Processing may begin with service provider 120 obtaining details regarding the premium media content sponsorship (block 710).

For example, assume that a target demographic for a particular restaurant includes customers between the ages of 25-40 with a household income of greater than $50,000/year and who dine out more than once per week on average. Media content delivery engine 210 may identify customers in the target demographic range based on information provided by CRM system 410 and/or third party data logic 440 (block 720). Media content delivery engine 210 may provide premium media content to geo-location 250 in media streams transmitted to the identified customers (block 720). For example, service provider 120 may provide the premium media content during video presentations currently being provided to the identified customers. Alternatively, the premium media content may be provided directly and may include a discount associated with viewing the premium discount. In some instances, service provider 120 may take into account the time of day when to provide the premium media content. For example, service provider 120 may provide the restaurant-related premium media content at 4:00 PM (e.g., shortly before dinner time for most customers).

Media content delivery engine 210 may track the customers' interaction with the premium media content (block 730). For example, when the premium media content is an interactive premium media content that allows the user to download a coupon or scan a QR code associated with a product or service, media content delivery engine 210 may determine how many times and the extent to which the users interacted with the premium media content (e.g., downloaded a coupon, printed out a coupon, scanned the QR code, etc.). Media content delivery engine 210 may then calculate an effectiveness measure associated with the premium media content sponsorship (block 740). For example, media content delivery engine 210 may calculate a return on investment metric based on the number of views, total amount of time the premium media content was viewed, number of downloads or coupons, number of scanned QR codes, etc., versus the cost of sponsorship. Media content delivery engine 210 may then provide the effectiveness metric to the sponsor (block 750). In this manner, media content delivery engine 210 may obtain real world statistics/data for use in selecting premium media content to be provided at particular geo-locations 250 to target customers.

Figure 8:
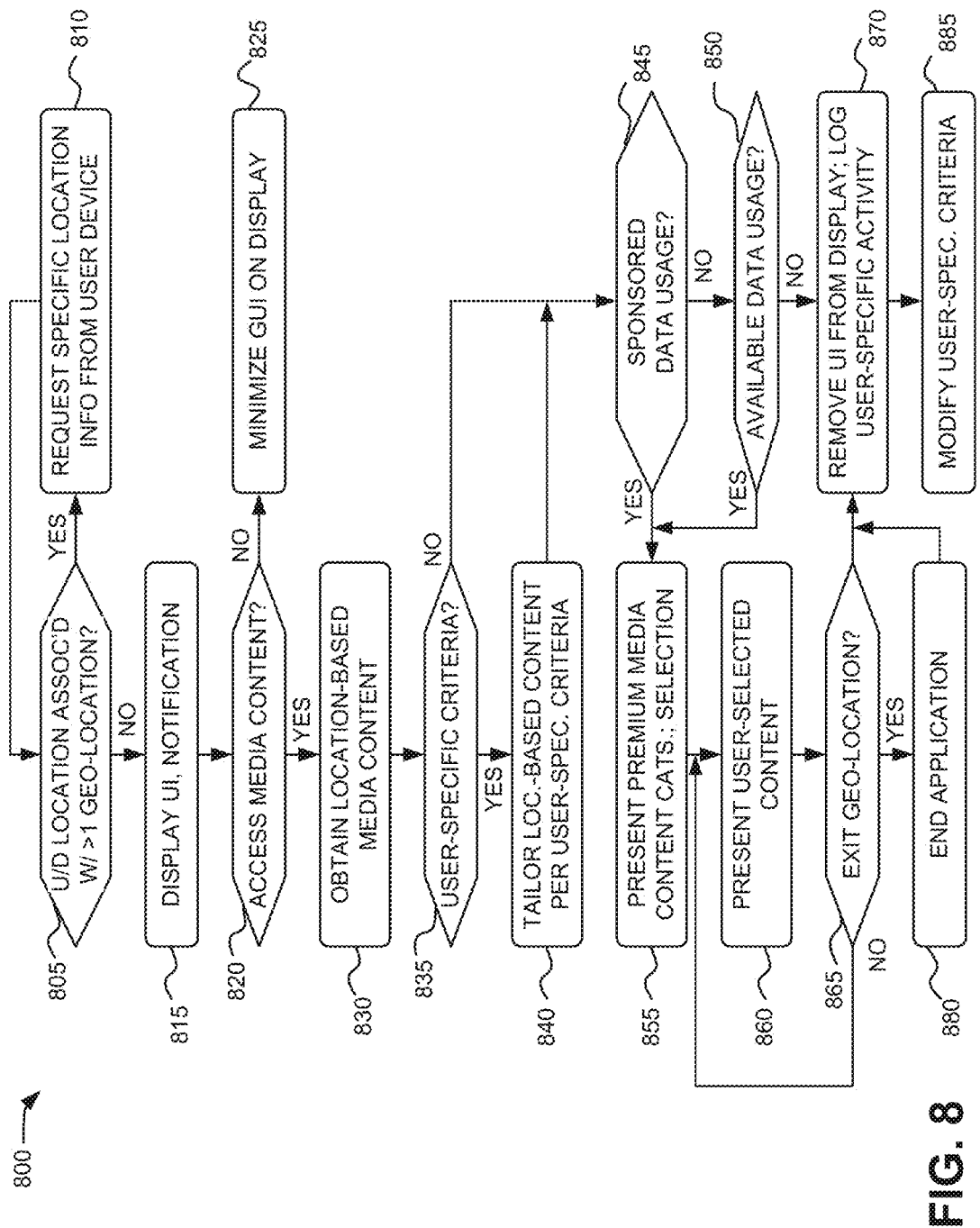
FIG. 8 is a flow diagram illustrating exemplary processing associated with providing dedicated premium media content at a location to a customer.

As described above, service provider 120 may use media content delivery engine 210 to identify and/or provide premium media content determined to more likely be of interest to a particular customer at geo-location 250 than premium media content that is provided to other customers at the same geo-location 250. In some implementations, service provider 120 may provide a dedicated media stream that provides premium media content to customers. FIG. 8 illustrates exemplary processing associated with providing a dedicated premium media content stream to geo-location 250.

Processing may begin with media content delivery engine 210 obtaining a location of user device 110 and determining whether geo-location 250 corresponds to a geo-location associated with service provider 120 (block 805). Media content delivery engine 210 may obtain a location of user device 110, for example, based on GPS information received via location determining logic 430 and/or media content delivery user interface 240. Additionally or alternatively, media content delivery engine 210 may obtain a location of user device 110, for example, based on information received from monitoring of one more geo-locations 250 and detecting a presence of user device 110 within a perimeter of one or more geo-location 250. Media content delivery engine 210 may translate or otherwise standardize the location information into a physical location (e.g., street address, coordinates, etc.) suitable for cross-referencing a data table of geo-locations 250 by physical address or vice versa.

When media content delivery engine 210 determines that more than one geo-location 250 corresponds to the location of user device 110 (block 805—YES), media content delivery engine 210 may generate a request for sending to user device 110 via media content delivery user interface 240 for additional location information (block 810). For example, the request may be to user device 110 to provide additional GPS or other geospatial location information. When media content delivery user interface 240 receives a response from user device 110 via network 130, either providing additional location information or indicating that no further location information is available, media content delivery engine 210 may refine the location accordingly and determine whether multiple geo-locations 250-1 to 250-N correspond to the refined location (block 805). When media content delivery engine 210 determines that more than one geo-location 250-1 to 250-N corresponds to the refined address (block 805—YES), media content delivery engine 210 may generate a request for sending to a user of user device 110 via media content delivery user interface 240 to provide specific location information (block 810). For example, the user may be requested to input information describing the user's immediate environment (suite number, floor number, room name/number, name of establishment, nature of business, etc.), and/or provide a prompt that includes options for the user to select with respect to a suite number, name of establishment, nature of business, etc., associated with the multiple geo-locations 250-1 to 250-N. When media content delivery user interface 240 receives a response from the user of user device 110 via network 130, either providing a description of the immediate environment and/or indicating a selection of a particular description option, media content delivery engine 210 may revise the location accordingly and determine whether multiple geo-locations 250-1 to 250-N correspond to the revised location (block 805).

When media content delivery engine 210 determines that only one geo-location 250-1 corresponds to the location of user device 110 (block 805—NO), media content delivery engine 210 may generate a user interface (e.g., GUI) for display via user device 110 and send a notification to user device 110 via media content delivery user interface 240. As an example screenshot illustrating an exemplary implementation shown in FIG. 9A, a graphical user interface (GUI) 900, displayed via user device 110, may provide a notification 910 to a user that the user has entered geo-location 250-1 (e.g., "Welcome! You've entered AccessDome Area—Premium content is available for you"). Other types of notifications may be used (e.g., audio, haptic, etc.). GUI 900 may include one or more buttons 920, for example, which the user may use to execute the geo-location application (e.g., "Explore") or to delete the notification and/or close the GUI (e.g., "Remind me later"). Graphical user interface 900 may include additional and/or alternative input mechanisms to those illustrated. User device 110 may include one or more applications that facilitate communication related to GUI functions with respect to media content delivery engine 210, in some implementations.

GUI 900 may receive a user input to not access the premium media content (block 820—NO), and the notification may be removed and GUI 900 minimized on the display of user device 110 (not shown in FIG. 9) (block 825). GUI 900 may receive a user input to access the premium media content (block 820—YES), and media content delivery engine 210 may obtain location-based content associated with the identified geo-location 250-1 (block 830), as described in detail above.

Media content delivery engine 210 may determine whether a user profile containing user-specific criteria for premium media content corresponds to an identifier associated with user device 110 (block 835). The identifier associated with user device 110 may be contained in communications with service provider 120 and cross-referenced with user profiles stored in a database. When a determination is made that user-specific criteria is associated with user device 110 (block 835—YES), media content delivery engine 210 may tailor the location-based media content using the user-specific criteria to personalize the media content as premium media content (block 840). For example, the user-specific criteria received from data management platform 220 may be applied to the location-based media content to eliminate, prioritize, and otherwise modify the identified location-based content according to the user-specific criteria.

After tailoring the location-based content (block 840) and/or determining that no user-specific criteria is associated with user device 110, premium media content delivery engine 210 may determine whether data usage for accessing the premium media content is sponsored (e.g., toll-free) (block 845). When a determination is made that data usage is not sponsored (block 845—NO), media content delivery engine 210 may determine whether user device 110 has available data usage for accessing the premium media content (block 850). When media content delivery engine 210 determines, by inquiring about available data usage for user device 110, that user device 110 has no available data usage for accessing the premium media content (block 850—NO), GUI 900 may be removed from the display on user device 110, the geo-location application may be ended, and the user's interactions with the GUI may be logged (block 870).

Based on a determination that data usage for accessing the premium content is sponsored (block 845—YES), and/or a determination that user device 110 has available data usage for accessing the premium media content (block 850—YES), media content delivery engine 210 may present, via media content delivery interface 240, categories of premium media content that may be accessed, via GUI 900 (block 855). As an example, a screenshot illustrating an exemplary implementation is shown in FIG. 9B.

Figures 9A, 9B, 9C:
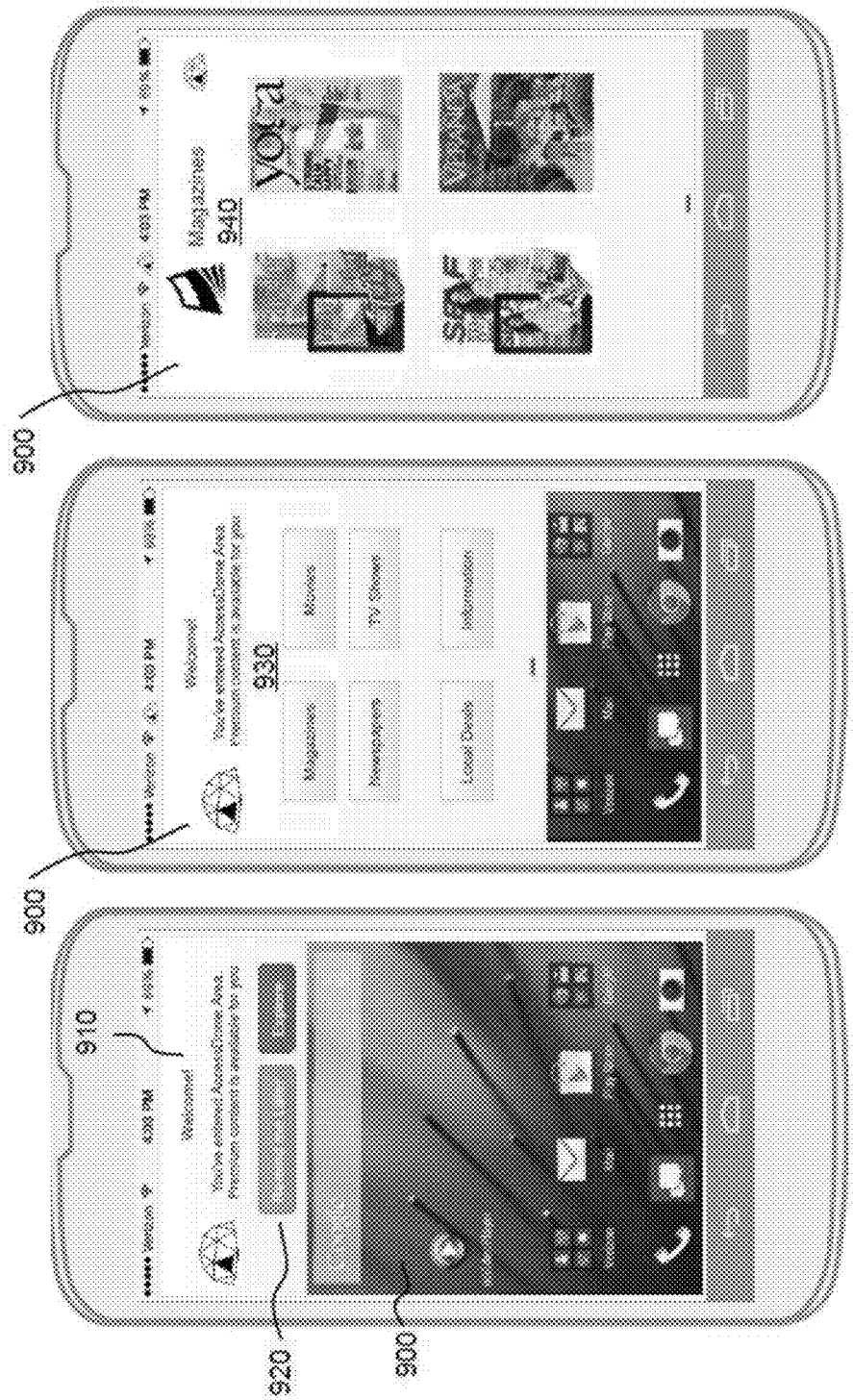
FIGS. 9A-C are screenshots illustrating exemplary graphic user interface displays associated with providing premium media content at a location to a customer.

Referring to FIG. 9B, GUI 900, displayed via user device 110, may provide a set of selectable category objects 930 corresponding to categories of premium media content that have been identified for access by the user of user device 110 (e.g., "Magazines," "Newspapers," "Local Deals," "Movies," "TV Shows," "Information," etc.). Other premium media content categories may be presented. Media content delivery engine 210 may receive, via media content user interface 240, user selection of one or more of the selectable category objects 930 (block 855).

For example, assume that the user selects "Magazines." Media content delivery engine 210 may present selected premium media content corresponding to the Magazines category (block 860). As an example, a screenshot illustrating an exemplary implementation is shown in FIG. 9C. Referring to FIG. 9C, GUI 900, displayed via user device 110, may provide a set of selectable magazine objects 940 representative of magazine covers for magazines that may be accessed by the user of user device 110 via media content delivery engine 210. The selections may substantially correspond to magazines subscribed to or otherwise made available in a waiting room/lobby of a doctor's office, as described above.

Media content delivery engine 210 may transmit the selected premium media content to user device 110 via media content delivery user interface 240 (block 860), for example, over a dedicated media stream via network 130. In some implementations, some of the premium media content provided may be interactive premium media content. For example, some of the premium media content may include widgets or interactive boxes that a user may select via GUI 900 and/or user device 110. Assume that the customer interacts with one of the widgets that allow the user to press an input button via GUI 900 and/or user device 100 to receive additional information, coupons and/or promotional codes associated with the premium media content (block 855). In this case, media content delivery engine 210 may deliver the coupon or promotional code redeemable for products and/or services.

Media content delivery engine 210 may periodically or continuously determine whether user device 110 remaining within the perimeter of geo-location 250-1, established at the doctor's office, car dealership, restaurant, hotel, etc., associated with geo-location 250-1 (block 865). For example, location information for user device 110 may be continuously updated and cross-referenced with the location of the geo-location 250-1's perimeter. Based upon a determination that user device 110 has not exited geo-location 250-1 (block 865—NO), media content delivery engine 210 may continue to present the user-selected premium media content. When media content delivery engine 210 determines that user device 110 is no longer within the perimeter of geo-location 250-1 (block 865—YES), media content delivery engine 210 may discontinue providing access to the premium media content (block 880). Alternatively, media content delivery engine 210 may continue to provide the access for a grace period (e.g., 1, 2, 5, 10, minutes, etc.). In some implementations, the user may be informed via GUI 900 that user device 110 is no longer within geo-location 250 and that access is going to be terminated. In other implementations, the premium media content may instead be "paused" until user device 110 returns within the perimeter of geo-location 250. In some implementations, the user may be prompted via GUI 900 to indicate how long (e.g., 1, 2, 5, 10, minutes, etc.) the user will be outside the geo-location before returning, and the user may be given the opportunity via GUI 900 to continue receiving the premium media content for the indicated length of time or to have the premium media content "paused" for the indicated length of time.

When the access is terminated, media content delivery engine 210 may log the user's interaction with the premium media content and no longer provide GUI 900 (block 870). Media content delivery engine 210 may use the logged user activity with the premium media content to modify user-specific criteria that is maintained, for example, by data management platform 220 (block 885).

The following use cases exemplify some features of providing access to premium media content at geo-location 250. Assume that a parent is in a waiting room at a pediatric doctor's office while the parent's child is being seen in an examination room. The parent may receive a notification on a cell phone (e.g., user device 110) indicating that the waiting room is a geo-location (e.g., geo-location 250-1) for which premium media content is available. In this case, the geo-location operator (e.g., office manager) has contracted with its service provider to make each of the magazines that the office subscribes to available via streaming of the premium media content. Thus, service provider 120's media content delivery engine 210 may send a list of magazines accessible via the parent's cell phone (e.g., user device 110). When received at the cell phone, media content delivery engine 210 may apply user-specific criteria, for example, the parent's preferences for media content, to narrow down the provided list to a handful of magazines that are of potential interest to the parent. The revised list of premium media content (e.g., magazines) may be presented via a GUI displayed on the cell phone. The parent may select, for example, the latest Health & Fitness and/or Parents magazine to access and view while waiting. The parent may not be charged a fee for accessing the magazine because the office has sponsored the premium media content. If the parent leaves the office to go to her car, she may exit the perimeter of geo-location 250-1 and thus lose access to the premium media content until she returns to the office. Similarly, geo-locations 250 may be established at any number of locations/establishments, such as a theme park, a hotel, a car dealership, a shopping mall, an airport, cafes, spas, schools, stadiums, etc.

Media content delivery engine 210 may continuously update the most likely relevant premium media content available at geo-location 250 from media content delivery engine 210 to enhance the customer's experience. In addition, in some implementations, media content delivery engine 210 may track the effectiveness of the premium media content at geo-location 250 in a similar manner as that described above with respect to FIG. 7. In still further implementations, media content delivery engine 210 may include premium media content at geo-location 250 that other customers indicated as being useful. For example, some premium media content may include interactive widgets that allow customers to rate the premium media content. In this case, premium media content that is rated very highly or as containing useful information may be identified in other users' profiles as preferred content.

Implementations described herein allow a service provider to provide premium media content that is likely to be relevant at a geo-location to a customer, and to provide an enhanced customer experience with respect to consuming premium media content. In addition, the service provider may continuously update information regarding the customer to further tailor the user's premium media content experience based on the customer's current habits, profile and/or preferences. In addition, implementations described herein allow a service provider to collect data regarding the effectiveness of premium media content or premium media content sponsorship and provide the effectiveness information to sponsors. This may allow sponsors to further tailor the sponsored premium media content to target customers.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, some of the implementations may provide various types of information to customers or users, such as video podcasts, streaming media presentations, interactive media presentations, etc. In each case, the service provider may identify premium media content that is potentially of interest to the particular customer or user and serve the identified premium media content to the customer/user.

Further, implementations described above refer to media content delivery engine 210 receiving inputs from CRM system 410, habit identifier logic 420, location determining logic 430, third party data logic 440, and media content delivery user interface 240. In other implementations, media content delivery engine 210 may receive inputs from additional sources that have information that can be used to generate information regarding the customer. In addition, media content delivery engine 210 may weight some of the received information more heavily than other information.

For example, media content delivery engine 210 may weight preference information received via media content delivery user interface 240 more heavily when attempting to identify relevant premium media content than premium media content received from third party data logic 440, since information from media content delivery user interface 240 represents explicit information regarding premium media content or types of premium media content that the customer would like to access and/or would not like to access. In such instances, explicit preference information from the customer is weighted more heavily than implicit information gained from analyzing the customer's related user activity.

Further, media content delivery engine 210 may weight information regarding some of the customer's habits differently than others. For example, a customer's recent Internet search queries may be weighted more heavily with respect to identifying relevant premium media content than a customer's habits with respect to Internet browsing. As an example, habit identifier logic 420 and/or media content delivery engine 210 may weight a search query from the customer for the term "subwoofer," followed by the customer searching several stereo retailer websites, very highly with respect to attempting to identify relevant premium media content. As a result, media content delivery engine 210 may insert premium media content for a stereo retailer into the customer's premium media content very soon after the customer's Internet search query. In some instances, service provider 120 may charge the stereo retailer more than its normal fee for providing the premium media content to a customer who recently performed such a search query (e.g., the search query for "subwoofer").

Still further, implementations described above refer to a customer setting preference information via media content delivery user interface 240 and media content delivery engine 210 identifying premium media content based on the customer provided information. In some implementations, different members of a customer's household may provide different preference information. For example, a parent in the customer's household may provide preference information to allow a child to view content appropriate for children. In this case, when the child is consuming electronic media, the child or parent may enter a code associated with the child such that media content delivery engine 210 provides only premium media content appropriate for children. At a later time, the parent may enter a code indicating that the parent is accessing media content and media content delivery engine 210 may provide premium media content based on the parent's preferences. In this manner, media content delivery engine 210 may deliver different premium media content or types of premium media content to a user device within a customer's household based on who the user is.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In addition, while series of acts have been described with respect to FIGS. 5-8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, via a network, first location information associated with a location of a mobile user device;
performing, using the first location information, a lookup in a database to determine whether the location is within a perimeter of a geo-fenced location, wherein the database stores location information associated with perimeters of geo-fenced locations associated with a service provider and physical addresses corresponding to the geo-fenced locations;
determining, based on performing the lookup, that the first location information corresponds to a first area that is within a perimeter of one or more geo-fenced locations associated with the service provider;
identifying media content associated with the one or more geo-fenced locations;
obtaining an identifier associated with the mobile user device;
determining whether user-specific criteria is associated with the identifier;
providing, by the service provider and while the mobile user device is located within the perimeter, access to the identified media content responsive to determining that no user-specific criteria is associated with the identifier;
applying, responsive to determining that user-specific criteria is associated with the identifier, the user-specific criteria to the identified media content to generate personalized media content; and
providing, by the service provider, access to the personalized media content while the mobile user device is present within the perimeter.

2. The method of claim 1, wherein determining that the first location information corresponds to a first area that is within a perimeter of one or more geo-fenced locations comprises determining that the first location information corresponds to a first area that is within a perimeter of multiple geo-fenced locations, the method further comprising:
sending, via the network and to the mobile user device, a request for second location information associated with the location of the mobile user device; and
determining that the second location information corresponds to a second area that is within the perimeter of at least one of the multiple geo-fenced locations,
wherein identifying media content comprises identifying media content for which access is provided to user devices present within the perimeter of the at least one of the multiple geo-fenced locations.

3. The method of claim 2, wherein determining that the second location information corresponds to a second area that is within a perimeter of at least one of the multiple geo-fenced locations comprises determining that the second location information corresponds to a second area that is within a perimeter of two or more of the multiple geo-fenced locations, the method further comprising:
sending, via the network and to the mobile user device, a prompt to a user of the mobile user device to input third location information associated with the location of the mobile user device; and determining that the third location information corresponds to a third area that is within the perimeter of only a first one of the multiple geo-fenced locations,
wherein identifying media content comprises identifying media content for which access is provided to user devices located within the perimeter of the first geo-fenced location.

4. The method of claim 1, further comprising:
determining that mobile user device has been relocated to outside the perimeter; and
terminating the access to the identified media content or the personalized media content.

5. The method of claim 1, further comprising:
identifying the user-specific criteria based on at least one of services subscribed to by a user of the mobile user device, products purchased by the user, media content consumed by the user, or demographic information associated with the user.

6. The method of claim 1, further comprising:
providing a user interface to the mobile user device, wherein the user interface is configured to:
present categories of the identified media content or the personalized media content for selection by a user, and
receive a user selection of one or more of the categories.

7. The method of claim 6, wherein the user interface is further configured to:
present a plurality of items of the identified media content or the personalized media content corresponding to the selected one or more categories, and
provide, responsive to selection of one of the items, the identified media content or the personalized media content to the mobile user device.

8. The method of claim 1, further comprising:
determining that a sponsor is associated with the one or more geo-fenced locations, wherein providing access to the identified media content or the personalized media content comprises:
providing, toll free to a user of the mobile user device, access to the identified media content or the personalized media content.

9. A system, comprising:
a service provider device configured to provide access to media content to a mobile user device; and
at least one logic device configured to:
receive, via a network, first location information associated with a location of the mobile user device,
determine, based on performing a lookup in a database that stores information associated with perimeters of geo-fenced locations associated with the service provider device and physical addresses corresponding to the geo-fenced locations, that the first location information corresponds to a first area that is within one or more geo-fenced locations associated with the service provider device,
identify media content associated with the one or more geo-fenced locations,
obtain an identifier associated with the mobile user device,
determine whether user-specific criteria is associated with the identifier,
provide, while the mobile user device is present within the one or more geo-fenced locations, access to the identified media content responsive to a determination that no user-specific criteria is associated with the identifier,
apply, responsive to a determination that user-specific criteria is associated with the identifier, the user-specific criteria to the identified media content to generate personalized media content, and
provide access to the personalized media content while the mobile user device is present within the one or more geo-fenced locations.

10. The system of claim 9, wherein the first area is within a perimeter of multiple geo-fenced locations, the at least one logic device being further configured to:
send, via the network and to the mobile user device, a request for second location information associated with the location of the mobile user device, and
determine that the second location information corresponds to a second area that is within the perimeter of at least one of the multiple geo-fenced locations,
wherein identifying media content comprises identifying media content for which access is provided to user devices present within the perimeter of the at least one of the multiple geo-fenced locations.

11. The system of claim 10, wherein the second area is within a perimeter of two or more of the multiple geo-fenced locations, the at least one logic device being further configured to:
send, via the network and to the mobile user device, a prompt to a user of the mobile user device to input third location information associated with the location of the mobile user device, and
determine that the third location information corresponds to a third area that is within the perimeter of only a first one of the multiple geo-fenced locations,
wherein identifying media content comprises identifying media content for which access is provided to user devices present within the perimeter of the first multiple geo-fenced location.

12. The system of claim 9, wherein the service provider device is further configured to:
identify the user-specific criteria based on at least one of services subscribed to by a user of the mobile user device, products purchased by the user, media content consumed by the user, or demographic information associated with the user.

13. The system of claim 9, wherein the service provider device is further configured to:
provide a user interface to the mobile user device, wherein the user interface is configured to:
present categories of the identified media content or the personalized media content for selection by a user, and
receive a user selection of one or more of the categories.

14. The system of claim 13, wherein the user interface is further configured to:
present a plurality of items of the identified media content or the personalized media content corresponding to the selected one or more categories, and
stream, responsive to selection of one of the items, the identified media content or the personalized media content to the mobile user device.

15. A mobile user device, comprising:
a communication interface configured to communicate to a service provider device via a network; and
logic configured to:
send, via the network, first location information associated with a location of the mobile user device,
receive, via the network and from the service provider device, information associated with one or more geo-fenced locations corresponding to the first location information, wherein the information associated with the one or more geo-fenced locations is retrieved from a database that stores location information associated with geo-fenced locations and physical addresses corresponding to the geo-fenced locations, determine whether user-specific criteria is associated with a user of the mobile user device, receive, from the service provider device and while the mobile user device is present within the one or more geo-fenced locations, access to media content associated with the one or more geo-fenced locations responsive to a determination that no user-specific criteria is associated with the user, apply, responsive to a determination that user-specific criteria is associated with the user, the user-specific criteria to the media content to identify personalized media content, and receive, from the service provider device, access to the personalized media content while the mobile user device is present within the one or more geo-fenced locations.

16. The mobile user device of claim 15, wherein the location of the user device is within a perimeter of multiple geo-fenced locations, the logic being further configured to:

receive, via the network and from the service provider device, a request for second location information associated with the location of the mobile user device, and receive, from the service provider device, an indication that the second location information corresponds to a second area that is within the perimeter of at least one of the multiple geo-fenced locations, wherein the media content comprises media content for which access is provided to user devices present within the perimeter of the at least one of the multiple geo-fenced locations.

17. The mobile user device of claim 16, wherein the second area is within a perimeter of two or more of the multiple geo-fenced locations, the logic being further configured to:

present, via a user interface of the mobile user device, a prompt to the user to input third location information associated with the location of the mobile user device, and receive, from the service provider device, an indication that the third location information corresponds to a third area that is within the perimeter of only a first one of the multiple geo-fenced locations, wherein the media content comprises media content for which access is provided to user devices present within the perimeter of the first geo-fenced location.

18. The mobile user device of claim 15, wherein the logic is further configured to:

identify the user-specific criteria based on at least one of services subscribed to by the user, products purchased by the user, media content consumed by the user, or demographic information associated with the user.

19. The mobile user device of claim 15, wherein the logic is further configured to:

display a user interface configured to:

present categories of the media content or the personalized media content for selection by the user, and receive a user selection of one or more of the categories.

20. The mobile user device of claim 19, wherein the user interface is further configured to:

present a plurality of items of the media content or the personalized media content corresponding to the selected one or more categories, and access, responsive to selection of one of the items, the media content or the personalized media content from the service provider device.

* * * * *